(12) United States Patent
Larson et al.

(10) Patent No.: US 10,518,472 B2
(45) Date of Patent: Dec. 31, 2019

(54) THERMAL DRYING SYSTEM FOR ADDITIVE MANUFACTURING DEVICE

(71) Applicant: Stratasys, Inc., Eden Prairie, MN (US)

(72) Inventors: Gary Larson, Independence, MN (US); Brian Sabart, Jordan, MN (US)

(73) Assignee: STRATASYS, INC., Eden Prairie, MN (US)

( * ) Notice: Subject to any disclaimer, the term of this patent is extended or adjusted under 35 U.S.C. 154(b) by 373 days.

(21) Appl. No.: 15/372,919

(22) Filed: Dec. 8, 2016

(65) Prior Publication Data

US 2017/0157855 A1 Jun. 8, 2017

Related U.S. Application Data

(60) Provisional application No. 62/264,563, filed on Dec. 8, 2015.

(51) Int. Cl.
| | |
|---|---|
| *B33Y 50/02* | (2015.01) |
| *B33Y 30/00* | (2015.01) |
| *B33Y 40/00* | (2015.01) |
| *B33Y 10/00* | (2015.01) |
| *B29C 64/321* | (2017.01) |
| *B29C 64/295* | (2017.01) |
| *B29C 64/336* | (2017.01) |

(Continued)

(52) U.S. Cl.
CPC .......... *B29C 64/364* (2017.08); *B29C 64/106* (2017.08); *B29C 64/255* (2017.08); *B29C 64/259* (2017.08); *B29C 64/307* (2017.08); *B29C 64/314* (2017.08); *B29C 64/371* (2017.08); *B33Y 30/00* (2014.12); *B33Y 40/00* (2014.12); *B33Y 50/02* (2014.12); *B01D 53/261* (2013.01); *B01D 53/268* (2013.01); *B29C 64/20* (2017.08)

(58) Field of Classification Search
CPC ..... B29C 64/118; B29C 64/106; B29C 64/20; B29C 64/255; B29C 64/259; B29C 64/295; B29C 64/307; B29C 64/314; B29C 64/321; B29C 64/364; B29C 64/371
See application file for complete search history.

(56) References Cited

U.S. PATENT DOCUMENTS 3,287,883 A * 11/1966 Mott .................... B01D 45/12
  137/565.18
4,653,199 A * 3/1987 McLeod ............. B01D 53/261
  34/72

(Continued)

FOREIGN PATENT DOCUMENTS

DE 102015111504 * 1/2017
WO 2010026397 A1 3/2010

*Primary Examiner* — Jeffrey M Wollschlager
(74) *Attorney, Agent, or Firm* — Westman, Champlin & Koehler, P.A.

(57) ABSTRACT

An additive manufacturing device includes at least one liquefier assembly that receives filament material from at least one feedstock and extrudes the material in a flowable form. A thermal drying system removes water vapor and heats compressed air to a preselected temperature set point to form conditioned air. At least one enclosed filament path houses and guides the filament material from a supply to the at least one liquefier assembly. The enclosed filament path is exposed to the conditioned air from the thermal drying system so as to keep the filament material dry as it is fed to the at least one liquefier assembly.

15 Claims, 3 Drawing Sheets

(51) Int. Cl.
*B29C 64/118* (2017.01)
*B01D 53/26* (2006.01)
*B29C 35/02* (2006.01)
*B29C 64/364* (2017.01)
*B29C 64/106* (2017.01)
*B29C 64/255* (2017.01)
*B29C 64/259* (2017.01)
*B29C 64/307* (2017.01)
*B29C 64/314* (2017.01)
*B29C 64/371* (2017.01)
*B29C 64/20* (2017.01)

(56) References Cited

U.S. PATENT DOCUMENTS

| | | | |
|---|---|---|---|
| 6,722,872 B1 | 4/2004 | Swanson et al. | |
| 6,923,634 B2 * | 8/2005 | Swanson | B29C 64/40 425/169 |
| 7,127,309 B2 | 10/2006 | Dunn et al. | |
| 7,374,712 B2 | 5/2008 | Swanson et al. | |
| 7,938,356 B2 | 5/2011 | Taatjes et al. | |
| 2009/0263582 A1* | 10/2009 | Batchelder | C22C 43/00 427/256 |
| 2010/0327479 A1* | 12/2010 | Zinniel | B29C 48/05 264/172.14 |
| 2011/0076496 A1* | 3/2011 | Batchelder | B33Y 70/00 428/373 |
| 2012/0068378 A1* | 3/2012 | Swanson | B33Y 10/00 264/308 |
| 2013/0078073 A1 | 3/2013 | Comb et al. | |
| 2013/0161432 A1 | 6/2013 | Mannella et al. | |
| 2013/0161442 A1 | 6/2013 | Mannella et al. | |
| 2014/0134335 A1* | 5/2014 | Pridoehl | B29C 64/106 427/256 |
| 2014/0141168 A1* | 5/2014 | Rodgers | C08L 77/02 427/265 |
| 2014/0158802 A1* | 6/2014 | Batchelder | B65H 49/02 242/163 |
| 2015/0217514 A1* | 8/2015 | Maier | B29C 64/255 264/241 |
| 2015/0231829 A1* | 8/2015 | Haider | B33Y 30/00 700/119 |
| 2016/0214175 A1 | 7/2016 | Nordstrom | |
| 2017/0259507 A1* | 9/2017 | Hocker | B33Y 10/00 |
| 2018/0169937 A1* | 6/2018 | Jones | F02K 9/12 |
| 2018/0200955 A1* | 7/2018 | Hoelldorfer | B33Y 70/00 |

* cited by examiner

THERMAL DRYING SYSTEM FOR ADDITIVE MANUFACTURING DEVICE

CROSS REFERENCE TO RELATED APPLICATION(S)

The present application claims the benefit of U.S. Provisional Patent Application Ser. No. 62/264,563 entitled THERMAL DRYING SYSTEM FOR ADDITIVE MANUFACTURING DEVICE which was filed on Dec. 8, 2015, the contents of which are incorporated by reference in its entirety.

BACKGROUND

The present disclosure relates to additive manufacturing systems for printing or otherwise producing three-dimensional (3D) parts and support structures. In particular, the present disclosure relates to a thermal drying system for keeping moisture from absorbing into filament material used for printing 3D parts and support structures in a layer-by-layer manner using an additive manufacturing technique.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, high speed sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a platen in planar layers. The extruded part material fuses to previously deposited part material, and solidifies upon a drop in temperature. The position of the print head relative to the substrate is then incremented, and the process is repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited pursuant to the generated geometry during the printing process. The support material adheres to the part material during fabrication, and is removable from the completed 3D part when the printing process is complete.

SUMMARY

An aspect of the present disclosure includes an additive manufacturing device having at least one liquefier assembly, a thermal drying system and at least one enclosed filament path. The at least one liquefier assembly is configured to receive filament material from at least one feedstock and extrude the material in a flowable form. The thermal drying system is configured to remove water vapor and heat compressed air to a set temperature to form conditioned air. The at least one enclosed filament path is configured to house and guide the filament material from a supply to the at least one liquefier assembly. The enclosed filament path is configured to be exposed to the conditioned air from the thermal drying system so as to keep the filament material from absorbing moisture as it is fed to the at least one liquefier assembly.

In another aspect of the present disclosure, an additive manufacturing device includes a first consumable supply containing a part filament material, a second consumable supply containing a support filament material, a first guide tube configured to provide an enclosed path for the part filament material from the first consumable supply to a first liquefier assembly and a second guide tube configured to provide an enclosed path for the support filament material from the second consumable supply to a second liquefier assembly. A thermal drying system is configured to remove water vapor and heat compressed air to a temperature set point to form conditioned air. The thermal drying system forces the conditioned air into the enclosed path of the first guide tube and the enclosed path of the second guide tube to keep the part filament material and the support filament material dry by preventing the absorption of moisture from ambient air.

In yet another aspect of the present disclosure, a method of keeping filament material in an additive manufacturing device dry before being extruded is also provided. The method includes removing water vapor from compressed air, heating the dried, compressed air to a preselected temperature set point to form conditioned air and introducing the conditioned air into at least one consumable supply of filament material in the additive manufacturing device to prevent the filament material from absorbing moisture from ambient air.

DEFINITIONS

Unless otherwise specified, the following terms as used herein have the meanings provided below:

The terms "preferred", "preferably", "example" and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

Described herein are embodiments of a thermal drying system for use in extrusion-based additive manufacturing devices to print 3D parts and support structures in a layer-by-layer manner using additive based techniques. Polymer feedstock, such as filament or ribbon, used in additive technologies can absorb moisture from ambient air once installed in the system. When the polymer feedstock is heated to extrusion temperature in an extruder or liquefier, any moisture contained in the feedstock may boil and create voids and defects in the material as it is extruded. High temperature polymers and composite materials are particularly susceptible to this problem. Commercial Stratasys FDM® systems use drying systems to keep filament feedstock dry as it is fed through the machine to the extruder. These drying systems use machine compressed shop air plumbed into a drying system. The embodiments described herein include a drying system where an incoming air supply is heated with an in-line heater to keep the feedstock dry as it is fed through the machine to the extruder.

Figure 1:
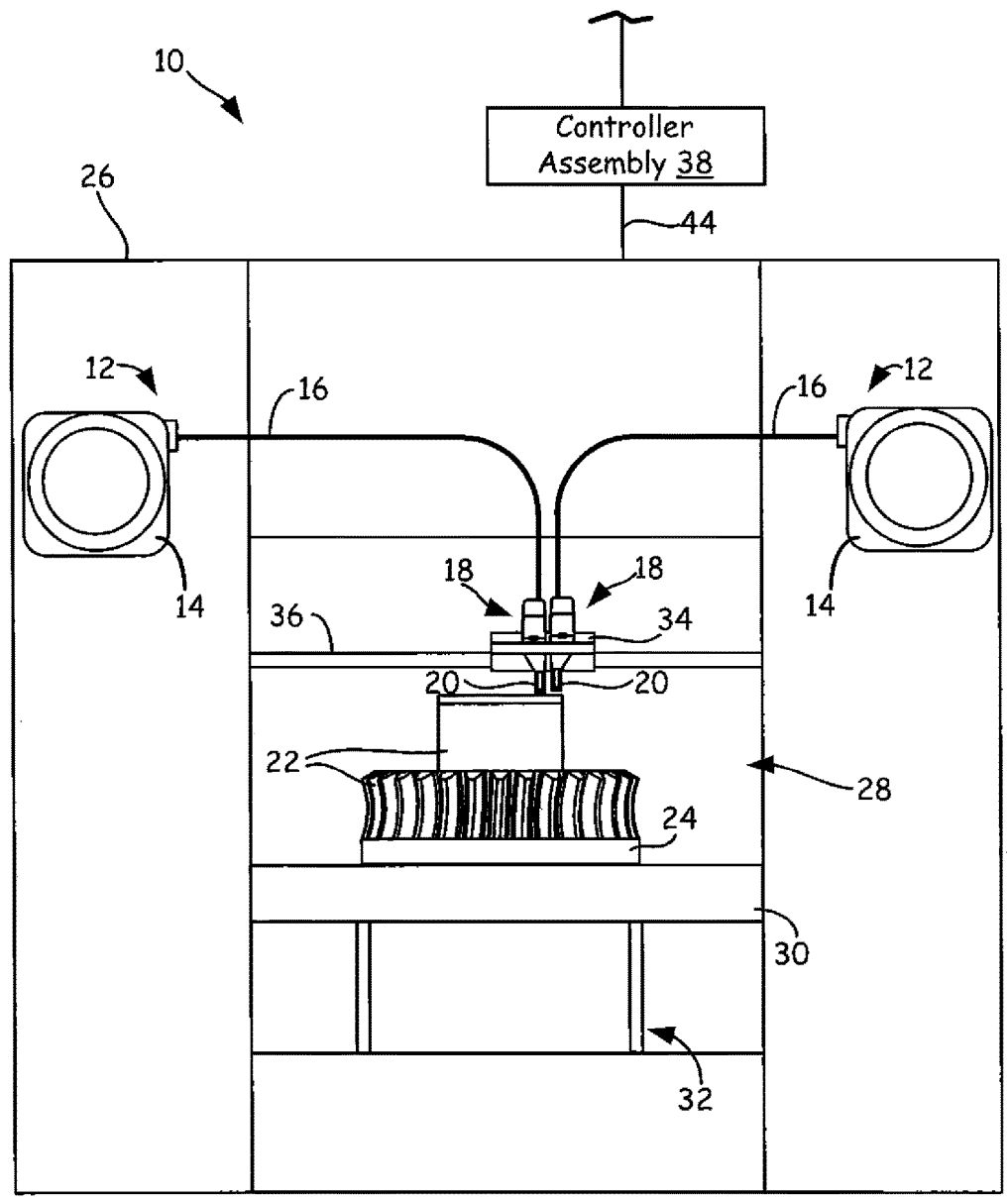
FIG. 1 is a block diagram of an additive manufacturing system configured to print 3D parts and support structures using a thermal drying system as described in the present disclosure.

The thermal drying system of the present disclosure may be used with any suitable extrusion-based additive manufacturing system or device. For example, FIG. 1 shows additive manufacturing system or device 10 in use with two consumable assemblies 12, where each consumable assembly 12 includes an easily loadable, removable, and replaceable container that retains a supply of a consumable filament or feedstock for printing with system or device 10. Typically, one of the consumable assemblies or first consumable assembly 12 contains a part material filament, and the other consumable assembly or second consumable assembly 12 contains a support material filament. However, both consumable assemblies 12 may be identical in structure, and in the second consumable assembly 12 may contain a second model material. Each consumable assembly 12 may retain a supply of consumable filament on a wound spool, a spool-less coil, or other supply arrangement, such as discussed in Swanson et al., U.S. Pat. No. 7,374,712; Taatjes at al., U.S. Pat. No. 7,938,356; Mannella et al., U.S. Publication Nos. 2013/0161432 and 2013/0161442; and Batchelder et al., U.S. Publication No. 2014/0158802. Likewise, device 10 may be configured to include any number of consumable assemblies 12.

Each consumable assembly 12 includes a container portion or supply 14 that holds a supply of consumable filament material, a guide tube 16, a print head 18 and a liquefier assembly 20 where the filament material is received and heated to extrusion temperatures (i.e., molten temperatures) for extruding the filament material into a flowable form. Container portion 14 may retain the spool or coil of a supply of consumable filament. In other embodiments, container portions 14 of consumable assemblies 12 may retain large supplies of the consumable filaments. This particularly suitable for use in a printing farm of automated systems 10 to increase the duration between change-overs of each consumable supply 12.

Each guide tube (or each of first and second guide tubes) 16 provides enclosed paths for interconnecting container portion 14 and print head 18, where a drive mechanism of print head 18 (or of system 10) draws successive segments of the consumable filament from container portion 14, through guide tube 16, to liquefier assembly (or each of first and second liquefier assemblies) 20 of print head 18. In one embodiment, guide tube 16 and print head 18 may be components of system 10, rather than a sub-component of consumable assemblies 12. In other embodiments, guide tube 16 and print head 18 are sub-components of consumable assembly 12, and may be interchanged to and from system 10 with each consumable assembly 12.

Exemplary system 10 is an additive manufacturing system for printing 3D parts or models and corresponding support structures (e.g., 3D part 22 and support structure 24) from the part and support material filaments, respectively, of consumable assemblies 12, using a layer-based, additive manufacturing technique. Suitable additive manufacturing systems for system 10 include extrusion-based systems developed by Stratasys, Inc., Eden Prairie, Minn. under the trademark "FDM."

As shown, system 10 includes system casing 26, chamber 28, platen 30, platen gantry 32, head carriage 34, and head gantry 36. System casing 26 is a structural component of system 10 and may include multiple structural sub-components such as support frames, housing walls, and the like. In some embodiments, system casing 26 may include container bays configured to receive container portions 14 of consumable assemblies 12. In alternative embodiments, the container bays may be omitted to reduce the overall footprint of system 10. In these embodiments, container portions 14 may stand proximate to system casing 26, while providing sufficient ranges of movement for guide tubes 16 and print heads 18 that are shown schematically in FIG. 1.

Chamber 28 is an enclosed environment that contains platen 30 for printing 3D part 22 and support structure 24. Chamber 28 may be heated (e.g., with circulating heated air) to reduce the rate at which the part and support materials solidify after being extruded and deposited (e.g., to reduce distortions and curling). In alternative embodiments, chamber 28 may be omitted and/or replaced with different types of build environments. For example, 3D part 22 and support structure 24 may be built in a build environment that is open to ambient conditions or may be enclosed with alternative structures (e.g., flexible curtains).

Platen 30 is a platform on which 3D part 22 and support structure 24 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape (e.g., under the trademark KAPTON from E.I. du Pont de Nemours and Company, Wilmington, Del.), or other disposable fabrication for adhering deposited material onto the platen 30 or onto the build substrate. Platen gantry 32 is a gantry assembly configured to move platen 30 along (or substantially along) the vertical z-axis.

Head carriage 34 is a unit configured to receive and retain one or both print heads 18, and is supported by head gantry 36. In the shown embodiment, head carriage 34 retains each print head 18 in a manner that prevents or restricts movement of the print head 18 relative to head carriage 34 in the x-y build plane, but allows the print head 18 to be controllably moved out of the x-y build plane (e.g., servoed, toggled, or otherwise switched in a pivoting manner). Head carriage also decreases the likelihood of binding while moving on the head gantry 34. When in active or extruding state, print head 18 is secured in each of the x, y and z planes as well as preventing pitch, roll and yaw relative to the head carriage 34. When in passive or non-extruding state, print head 18 is moved through the z plane in an arcuate path by changing pitch of print head 18. In further embodiments, print heads 18 and corresponding head carriage 34 may optionally have different configurations. For example, print heads 18 and head carriage 34 may be integrated as a single unit and a different number of print heads may be used.

In the shown embodiment, head gantry 36 is a robotic mechanism configured to move head carriage 34 (and the retained print heads 18) in (or substantially in) a horizontal x-y plane above platen 30. Examples of suitable gantry assemblies for head gantry 36 include those disclosed in Swanson et al., U.S. Pat. No. 6,722,872; and Comb et al., U.S. Publication No. 2013/0078073, where head gantry 36 may also support deformable baffles (not shown) that define a ceiling for chamber 28. Head gantry 36 may utilize any suitable bridge-type gantry or robotic mechanism for moving head carriage 34 (and the retained print heads 18), such as with one or more motors (e.g., stepper motors and encoded DC motors), capstans, pulleys, belts, screws, robotic arms, and the like.

In an alternative embodiment, platen 30 may be configured to move in the horizontal x-y plane within chamber 28, and head carriage 34 (and print heads 18) may be configured to move along the z-axis. Other similar arrangements may also be used such that one or both of platen 30 and print heads 18 are moveable relative to each other. Platen 30 and head carriage 34 (and print heads 18) may also be oriented along different axes. For example, platen 30 may be oriented vertically and print heads 18 may print 3D part 22 and support structure 24 along the x-axis or the y-axis.

System 10 also includes controller assembly 38, which may include one or more control circuits (e.g., controller 40) and/or one or more host computers (e.g., computer 42) configured to monitor and operate the components of system 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print heads 18, chamber 28 (e.g., with a heating unit for chamber 28), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of system 10. While illustrated as a single signal line, communication line 44 may include one or more electrical, optical, and/or wireless signal lines, which may be external and/or internal to system 10, allowing controller assembly 38 to communicate with various components of system 10.

During operation, controller assembly 38 may direct platen gantry 32 to move platen 30 to a predetermined height within chamber 28. Controller assembly 38 may then direct head gantry 36 to move head carriage 34 (and the retained print heads 18) around in the horizontal x-y plane above chamber 28. Controller assembly 38 may also direct print heads 18 to selectively draw successive segments of the consumable filaments from container portions 14 and through guide tubes 16, respectively.

Figure 2:
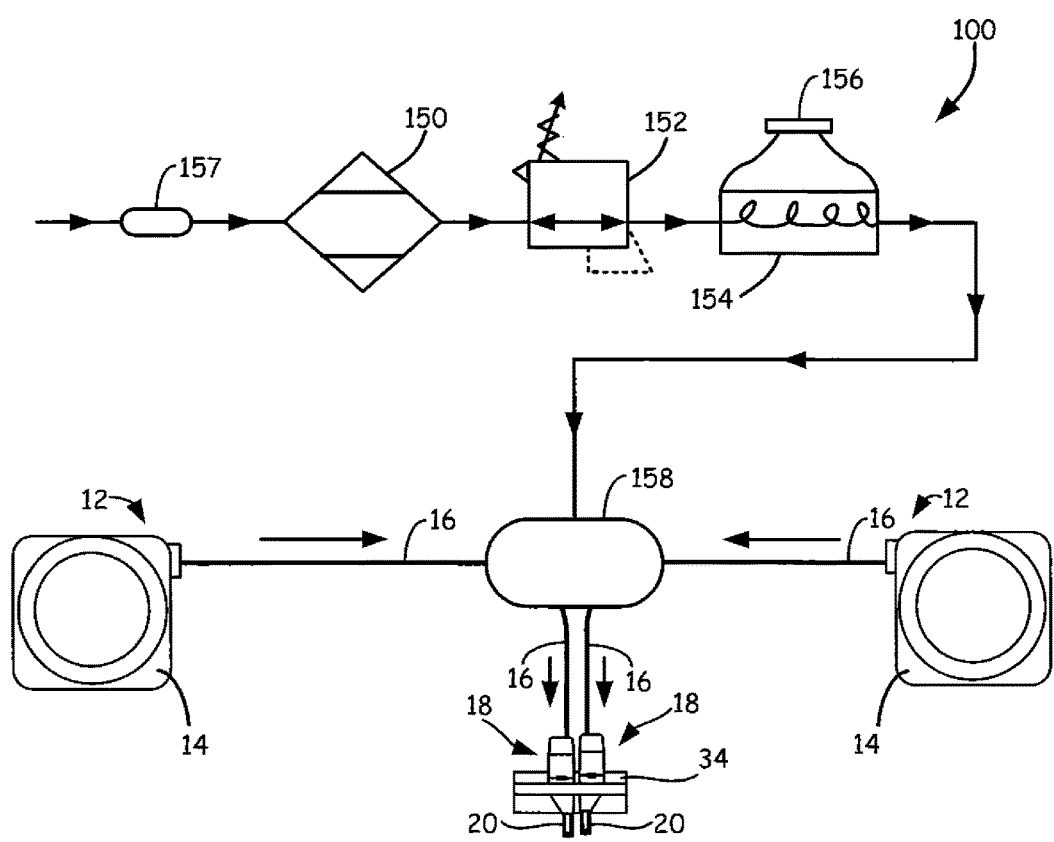
FIG. 2 is a schematic diagram of the thermal drying system according to one embodiment.
Figure 3:
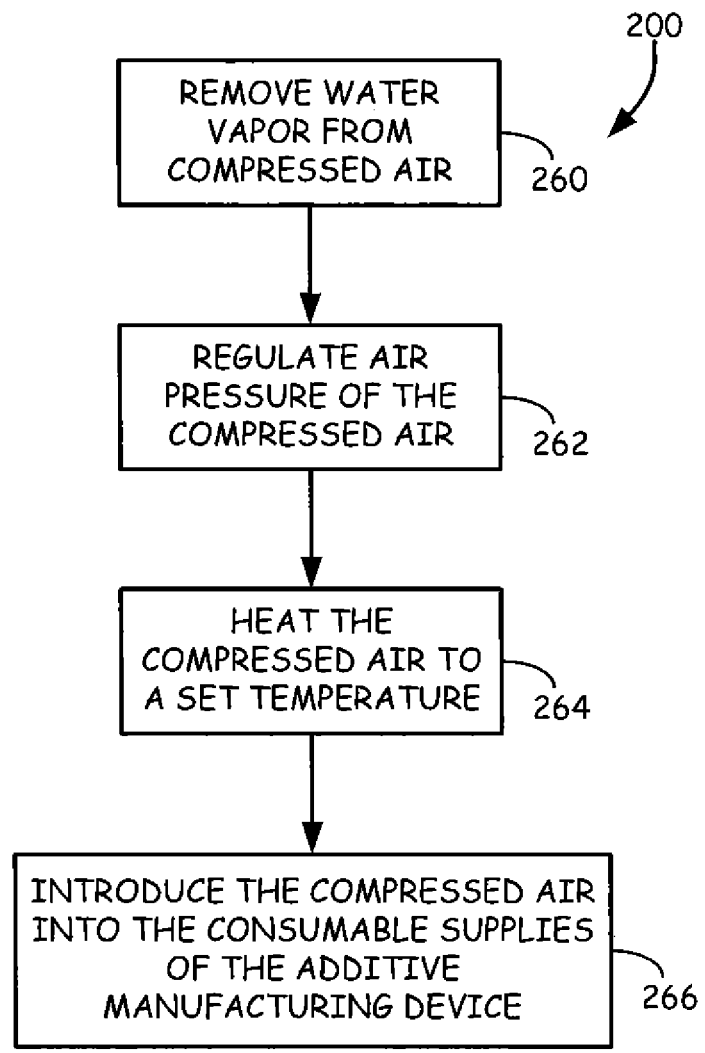
FIG. 3 is a block diagram of a method of keeping filament material in an additive manufacturing device dry before being extruded.

FIG. 2 is a schematic diagram of a thermal drying system 100 in an additive manufacturing system or device according to one embodiment. Thermal drying system 100 includes an air dryer 150, an air pressure regulator 152 and a heater 154 with temperature controller 156. FIG. 3 is a block diagram 200 of a method of keeping filament material in a feedstock dry before the filament material is fed to a liquefier in an additive manufacturing system or device. At element 157, machine compressed air (i.e., shop air) is introduced into thermal drying system 100. Compressed air concentrates atmospheric contaminants, including water vapor, and raises the dew point of the compressed air relative to atmospheric air. The compressed air then runs through air dryer 150 to remove water vapor from the compressed air as illustrated at block 260 in FIG. 3.

There are many different types of air dryers that may be used for air dryer 150. For example, a deliquescent dryer consists of a pressure vessel that is filled with a hygroscopic medium that absorbs water vapor. The medium gradually dissolves or deliquesces to form a solution at the base of the pressure vessel. While liquid must be regularly drained and new medium must be added, deliquescent dyers have no moving parts and do not require electrical power for operation. Another example air dryer includes a desiccant dryer where compressed air is passed through a pressure vessel filled with two separate chambers of media, such as activated alumina, silica gel, molecular sieve of other desiccant material. The desiccant material attracts the water from the compressed air using adsorption. As water clings to the desiccant material in the first chamber, the desiccant becomes saturated and needs to be purged. At this point the dryer switches the compressed air to flow through the second chamber of desiccant material while the first chamber of desiccant material is purged using some of the compressed air from the system to blow the water that has adhered to the desiccant off. Yet another exemplary air dryer includes a membrane dryer, which first filters the compressed air with a coalescing filter. This type of filter removes liquid water and other particulate from the compressed air that runs through the center bore of the membrane. At the same time, a small portion of the dried air is redirected along the outside surface of the filter to sweep out the water vapor which has permeated the membrane and is vented to atmosphere.

After the compressed air is dried in dryer 150, the compressed air is sent through pressure regulator 152 to regulate the air pressure of the compressed air as illustrated at block 262 in FIG. 3. Pressure regulator 152 includes a restricting element, a loading element and a measuring element. In FIG. 2, high pressure gas enters into regulator 152 through an inlet. The air enters the body of the regulator, which is controlled by the restricting element, such as a valve that can provide variable restriction to flow. The loading element, or spring, applies the needed force to restrict the restricting element. The measuring element determines when the inlet flow is equal to the outlet flow and is often provided by the restricting element or valve as a combined element.

After the demand for air in system 100 matches the airflow through regulator 152, the dried compressed air is sent through a heater 154 having temperature control 156 to heat the compressed air to a set temperature as illustrated at block 264 of FIG. 3. Heater 154 raises the temperature of the compressed air to a desired or preselected temperature set point to form conditioned air before introducing the conditioned air to consumable assembly 12. Heater 154 sets and varies the temperature of the conditioned air so that it is relative to the properties of the feedstock or filament material being fed through tubes 16. Exemplary temperature set point ranges of heater 154 include between about 125° F. and 415° F. depending upon the materials being used. For example, heater control 156 should set heater 154 so that the compressed air is heated to a higher temperature, such as a temperature of up to about 415° F., when the feedstock is composed of high temperature polymers and composite materials. Being exposed to conditioned dry air at these high temperatures will keep the high temperature polymers and composite materials of the feedstock dry as it is fed to the liquefier assemblies 22 in printheads 18. Lower temperature feedstock materials will require a lower set point temperature to prevent degradation or melting of the materials.

After the compressed air is heated by heater 154, the compressed air is introduced into consumable assemblies 12 and thereby exposed to the filament material in the feedstock via outlet 158. Such introduction is described in block 266 of the method illustrated in FIG. 3. Filament material is enclosed in guide tubes or filament paths 16 that extend from container portions or supplies 14 of consumable assemblies 12 to outlet 158 of thermal drying system 100. At outlet 158, tubes or paths 16 include discontinuities or ports so that the filament material is exposed to the conditioned air (i.e., heated and dried compressed air) at a sealed outlet 158. The filament material is again enclosed in tubes or paths 16 that extend from outlet 158 to the liquefier assemblies 22 in printheads 18. In this way, filament material is allowed to be exposed to the conditioned air from the time it leaves container portions 14 until it enters liquefier assemblies 22 of printheads 18. It should be realized that even though the filament material (whether part-type or support-type) is exposed to thermal drying system 100 by interposing the thermal drying system 100 between container portions 14 and liquefier assemblies 22, the enclosed paths provided by guide tubes 16 remain enclosed to ambient conditions.

In addition, the pressure at outlet 158 of thermal drying system 100 is higher than ambient pressure. Therefore, any leakage in outlet 158 is in a direction out of thermal drying system 100 and into the ambient environment, also preventing ambient moisture from entering into consumable assemblies 12.

It been observed that many additive manufacturing systems require filaments having about 0.04 weight percent and preferably 0.02 weight percent or less moisture to prevent foaming during the heating of the filament to a molten state for extrusion. Typically, filament is provided in a moisture resistant packaging to prevent the absorption of ambient moisture. However, the present disclosure may allow for the elimination of the moisture resistant packaging where the disclosed drying system is capable of reducing the moisture content to the recommended moisture content for extrusion.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An additive manufacturing device comprising:
at least one liquefier assembly configured to receive a filament material from at least one feedstock and extrude the material in a flowable form;
a thermal drying system configured to receive a stream of machine compressed air, the thermal drying system comprising:
an air dryer configured to intake and remove moisture from the machine compressed air and to thereby output an airflow of dried compressed air;
an air pressure regulator configured to receive the airflow of dried compressed air and to regulate a pressure of the dried compressed air to a pressure below a pressure of the received dried compressed air and above ambient air pressure and to thereby output an airflow of pressure-regulated dried compressed air; and
a heater having a temperature controller configured to intake and heat the airflow of pressure-regulated dried compressed air to a preselected temperature set point based on properties of the filament material and to thereby form conditioned air; and
at least one enclosed filament path configured to house and guide the filament material from a supply to the at least one liquefier assembly, wherein the enclosed filament path is configured to receive the conditioned air from the thermal drying system, to maintain a positive pressure within the enclosed filament path, and to keep the filament material from absorbing moisture as it is fed to the at least one liquefier assembly.

2. The additive manufacturing device of claim 1, wherein the air dryer comprises one of a deliquescent, desiccant and membrane air dryer.

3. The additive manufacturing device of claim 1, wherein the preselected temperature set point varies based on a type of filament material.

4. The additive manufacturing device of claim 1, wherein the preselected temperature setpoint is in a range between about 125° F. and 415° F.

5. The additive manufacturing device of claim 1, wherein the at least one liquefier assembly comprises a first liquefier assembly configured to receive a part filament material that is fed from a first feedstock through a first enclosed filament path, wherein the thermal drying system is configured to expose the conditioned air to the part filament material in the first enclosed path.

6. The additive manufacturing device of claim 5, wherein the at least one liquefier assembly comprises a second liquefier assembly configured to receive a support filament material that is fed from a second feedstock through a second enclosed filament path, wherein the thermal drying system is configured to expose the conditioned air to the support filament material in the second enclosed path.

7. An additive manufacturing device comprising:
a first consumable supply containing a part filament material;
a second consumable supply containing a support filament material;
a first guide tube configured to provide a first enclosed path for the part filament material from the first consumable supply to a first liquefier assembly;
a second guide tube configured to provide a second enclosed path for the support filament material from the second consumable supply to a second liquefier assembly; and
a thermal drying system configured to receive machine shop compressed air, reduce pressure of the compressed air, remove water vapor and heat the compressed air to a temperature set point to form conditioned air, the thermal drying system comprising:
an air dryer configured to intake and remove moisture from the machine compressed air and to thereby output an airflow of dried compressed air;
an air pressure regulator configured to receive the airflow of dried compressed air and to regulate a pressure of the dried compressed air to a pressure below a pressure of the received dried compressed air and above ambient air pressure and to thereby output an airflow of pressure-regulated dried compressed air; and
a heater having a temperature controller configured to heat the airflow of pressure-regulated dried compressed air to a preselected temperature set point based on properties of the filament material and to thereby form conditioned air; and
wherein the thermal drying system forces the conditioned air into the enclosed path of the first guide tube and the enclosed path of the second guide tube to maintain a positive pressure within the enclosed filament paths of the first guide tube and the second guide tube to keep the part filament material and the support filament material from absorbing moisture as the part filament is fed to the first liquefier assembly and the second liquefier assembly.

8. The additive manufacturing device of claim 7, wherein the preselected temperature set point varies based on a type of the part filament material and the support filament material.

9. The additive manufacturing device of claim 7, wherein the air dryer comprises one of a deliquescent, desiccant and membrane air dryer.

10. The additive manufacturing device of claim 7, wherein the preselected temperature set point varies based on a type of filament material.

11. The additive manufacturing device of claim 7, wherein the preselected temperature setpoint is in a range of between about 125° F. and 415° F.

12. A method of keeping filament material in an additive manufacturing device dry before being extruded, the method comprising:
providing a machine shop source of compressed air at a first pressure;
removing water vapor from the compressed air by processing the compressed air through an air dryer to output an airflow of dried compressed air;
processing the outputted air flow of dried compressed air through a pressure regulator to reduce the pressure of the outputted dried compressed air to provide the dried compressed air at a second pressure that is less than the first pressure and above ambient air pressure and thereby outputting an airflow of pressure-regulated dried compressed air;
heating the pressure-regulated dried compressed air at the second pressure in a heater to raise the temperature of the pressure-regulated dried compressed air to a preselected temperature set point based on properties of the filament material to form conditioned air; and
introducing the conditioned air into an enclosed filament path to house and guide the filament material from a supply to a liquefier assembly, wherein the conditioned air maintains a positive pressure within the enclosed filament path such that the filament material is prevented from absorbing moisture from ambient air.

13. The method of claim 12, wherein heating the pressure-regulated dried compressed air to a preselected temperature set point comprises varying the set temperature using a temperature controller to control the heater so that the preselected temperature set point varies depending on a type of filament material.

14. The method of claim 12, wherein introducing the conditioned air into the enclosed filament path comprises introducing the conditioned air into an enclosed path that houses and guides the filament material from a container portion to a liquefier assembly of the additive manufacturing device.

15. The method of claim 12, wherein introducing the conditioned air into the enclosed filament path comprises introducing the conditioned air into a first enclosed path that houses and guides a part filament material from a first container portion to a first liquefier assembly of the additive manufacturing device and introducing the conditioned air into a second enclosed path that houses and guides a support filament material from a second container portion to a second liquefier assembly of the additive manufacturing device.

* * * * *